United States Patent
Nunez

(10) Patent No.: US 10,279,958 B2
(45) Date of Patent: May 7, 2019

(54) EFFICIENT CONTAINER FOR STORING AND CONSUMING FROZEN FOODS

(71) Applicant: Luis Gilberto Escobar Nunez, Coral Gables, FL (US)

(72) Inventor: Luis Gilberto Escobar Nunez, Coral Gables, FL (US)

( * ) Notice: Subject to any disclaimer, the term of this patent is extended or adjusted under 35 U.S.C. 154(b) by 0 days.

(21) Appl. No.: 15/849,312

(22) Filed: Dec. 20, 2017

(65) Prior Publication Data

US 2018/0111719 A1 Apr. 26, 2018

Related U.S. Application Data

(63) Continuation of application No. 15/271,805, filed on Sep. 21, 2016, now abandoned.

(51) Int. Cl.
*B65D 25/04* (2006.01)
*B65D 85/00* (2006.01)
*B65D 25/06* (2006.01)
B65D 85/78 (2006.01)

(52) U.S. Cl.
CPC .............. *B65D 25/04* (2013.01); *B65D 25/06* (2013.01); *B65D 85/70* (2013.01); *B65D 85/78* (2013.01)

(58) Field of Classification Search
CPC ...... B65D 25/04–25/087; B65D 85/70–85/80; B65D 1/24; B65D 1/36; B65D 5/46064; B65D 5/46184; B65D 5/48–5/50
USPC .................................................. 220/500–557
See application file for complete search history.

(56) References Cited

U.S. PATENT DOCUMENTS

| | | | | |
|---|---|---|---|---|
| 5,074,777 A | * | 12/1991 | Garner | A21B 3/13 220/531 |
| 5,950,834 A | * | 9/1999 | Woodnorth | A45C 11/20 206/541 |
| 5,976,588 A | * | 11/1999 | Vincent | A23G 9/00 426/119 |
| 2014/0103033 A1 | * | 4/2014 | Beckman | B65D 25/04 220/4.01 |
| 2014/0110283 A1 | * | 4/2014 | Baugh | B65D 25/08 206/221 |
| 2014/0158694 A1 | * | 6/2014 | Martin | B65D 85/78 220/529 |
| 2015/0164105 A1 | * | 6/2015 | Peskin | A23G 9/045 426/119 |
| 2017/0144829 A1 | * | 5/2017 | Muhammad | B65D 85/78 |

* cited by examiner

*Primary Examiner* — Kareen K Thomas
(74) *Attorney, Agent, or Firm* — Michael L. Greenberg, Esq.; Greenberg & Lieberman, LLC

(57) ABSTRACT

An efficient container apparatus equipped with at least one removable separator is described. The at least one separator is disposed within a cavity of the container, and is configured to separate frozen contents housed within the container in order to prevent the sticking of the food contents together into a singular mass during freezing and/or refreezing. The at least one separator is preferably a cross-sectional separator, configured to temporarily divide the cavity of the container. The use of the present invention is designed for the preparation, and consumption thereof, a smoothie or similar frozen mixed product. After blending of the frozen food contents, the contents may be returned to the container to facilitate consumption of the smoothie from the container via a straw or spoon.

15 Claims, 4 Drawing Sheets

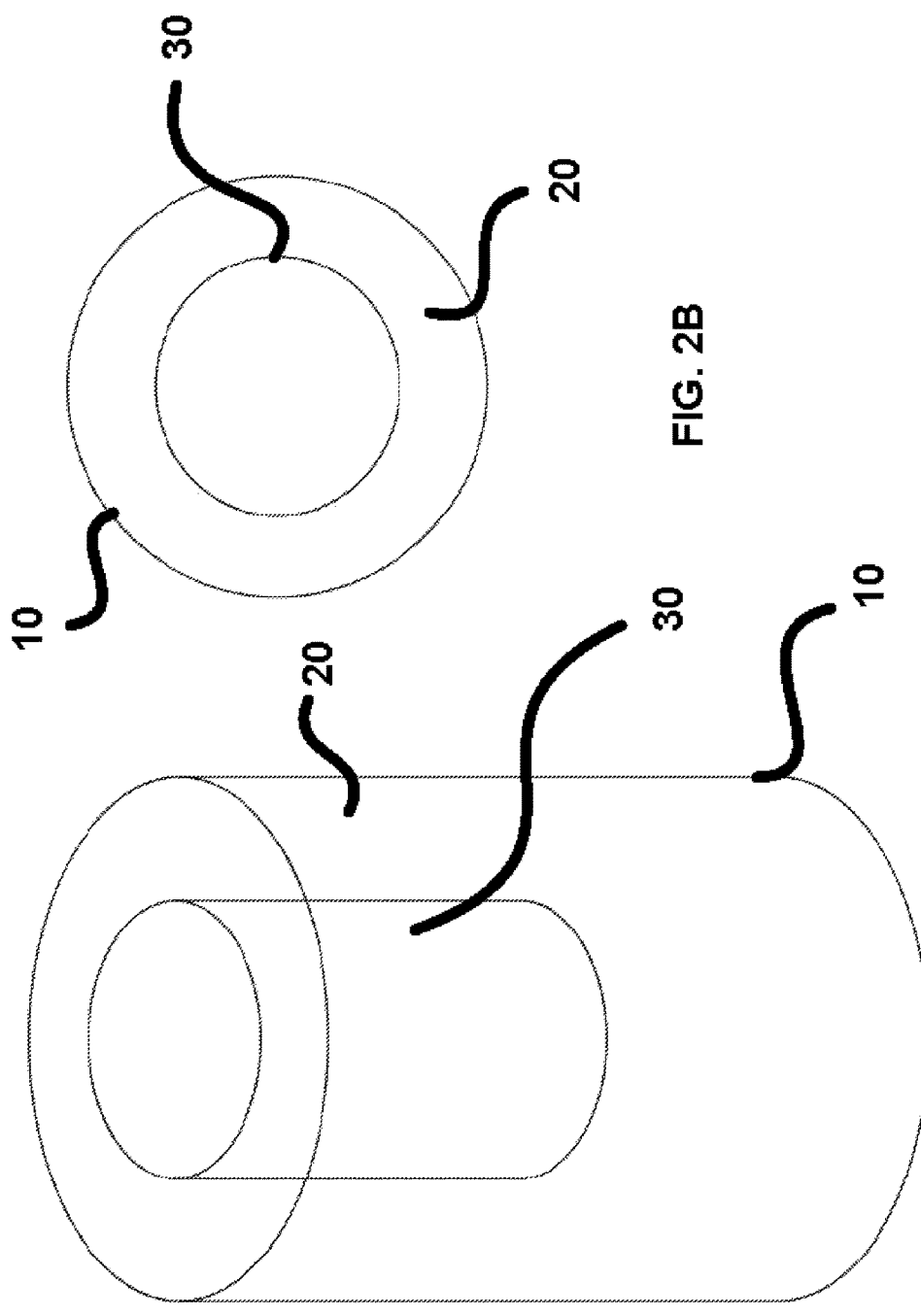

US 10,279,958 B2

EFFICIENT CONTAINER FOR STORING AND CONSUMING FROZEN FOODS

CONTINUITY

This application is a Continuation-in-Part application of non-provisional patent application Ser. No. 15/271,805, filed on Sep. 21, 2016, and priority is claimed thereto.

FIELD OF THE PRESENT INVENTION

The present invention relates to the field of frozen foods and the design of their respective packaging containers. More specifically, the present invention present comprises an efficient design which prevents frozen foods such as fruits, vegetables and others to stick together when stored together. This design allows one to separate the mixture of ingredients within the container, and ultimately make it easier to blend, separate and/or liquefy at the moment of use.

BACKGROUND OF THE PRESENT INVENTION

There are several techniques used to prevent frozen foods such as fruits from sticking one another when packed together in one container. Freezing the fruits separately and individually, is among the most common. Current methods of freezing foods to prevent them from sticking together include freezing them separately (individually) first, best known as IQF (Individually Quick Frozen). For instance mango slices, blueberries, pears, strawberries, peaches and so on are frozen individually first before being stored in a bag together. This technique prevents the fruits from sticking together when packed together in a bag or container. However, this solution is not perfect because if the food is not maintained frozen until use it can unfreeze and stick together again when frozen again.

The problem with this method is that when customers buy a frozen package of fruits, the fruit unfreezes in the time that it takes the customer to take the frozen package back home. When customers buy a frozen bag of fruits in a supermarket or grocery store, they take it out of the freezer to buy it and take it home. In this period of time, while the product is exposed to external heat until it is placed again in a freezer at home, the product unfreezes, and then sticks together when it is frozen again at home. When the customer arrives home and stores the package of fruit in his freezer, the fruit is frozen again, and since the fruit pieces are no longer separated they stick together forming large chunks of fruit, which are difficult to blend.

Thus, there is a need for a new form of frozen food container apparatus, which is configured to separate the frozen ingredients needed to prepare a smoothie in such a way that when it unfreezes and subsequently freezes again, it forms smaller pieces. In such an apparatus, the food pieces still stick together; however, the re-freezing process forms smaller pieces, which are ultimately easier to blend at the moment of use upon removal from the apparatus. The bulk size of the food pieces is smaller which ultimately makes it easier to separate and/or liquefy at the moment of use. Additionally, such an apparatus is preferably configured to be used as a container for consumption of the frozen foods (via a straw) after blending with a mixer or blender.

SUMMARY OF THE PRESENT INVENTION

This Summary of the Invention is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is a frozen food container apparatus equipped with at least one separator housed within the container. The at least one separator is disposed within the cavity of the container, and ensures that small (easily blendable/separable) segments of frozen food are present within the container in which frozen foods may be stored until use.

The container apparatus of the present invention enables a consumer to easily remove the frozen food contents of the container for placement into a blender, such as in cases of making a smoothie. Then, once the frozen food is blended, the at least one separator may be removed from the container such that the blended smoothie may be easily returned to the container for consumption on-the-go. As such, the present invention provides an all-in-one solution for storage, preparation, transportation, and consumption of a frozen blended smoothie, ice cream, or similar food which is fit for transit.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein:

FIG. 2A exhibits an alternate embodiment of the container apparatus of the present invention, showing a cylindrical separator housed within the container, as seen from the side.

FIG. 2B exhibits an alternate embodiment of the container apparatus of the present invention, showing a cylindrical separator housed within the container, as seen from the top.

DETAILED DESCRIPTION OF THE PREFERRED EMBODIMENT

Figure 1:
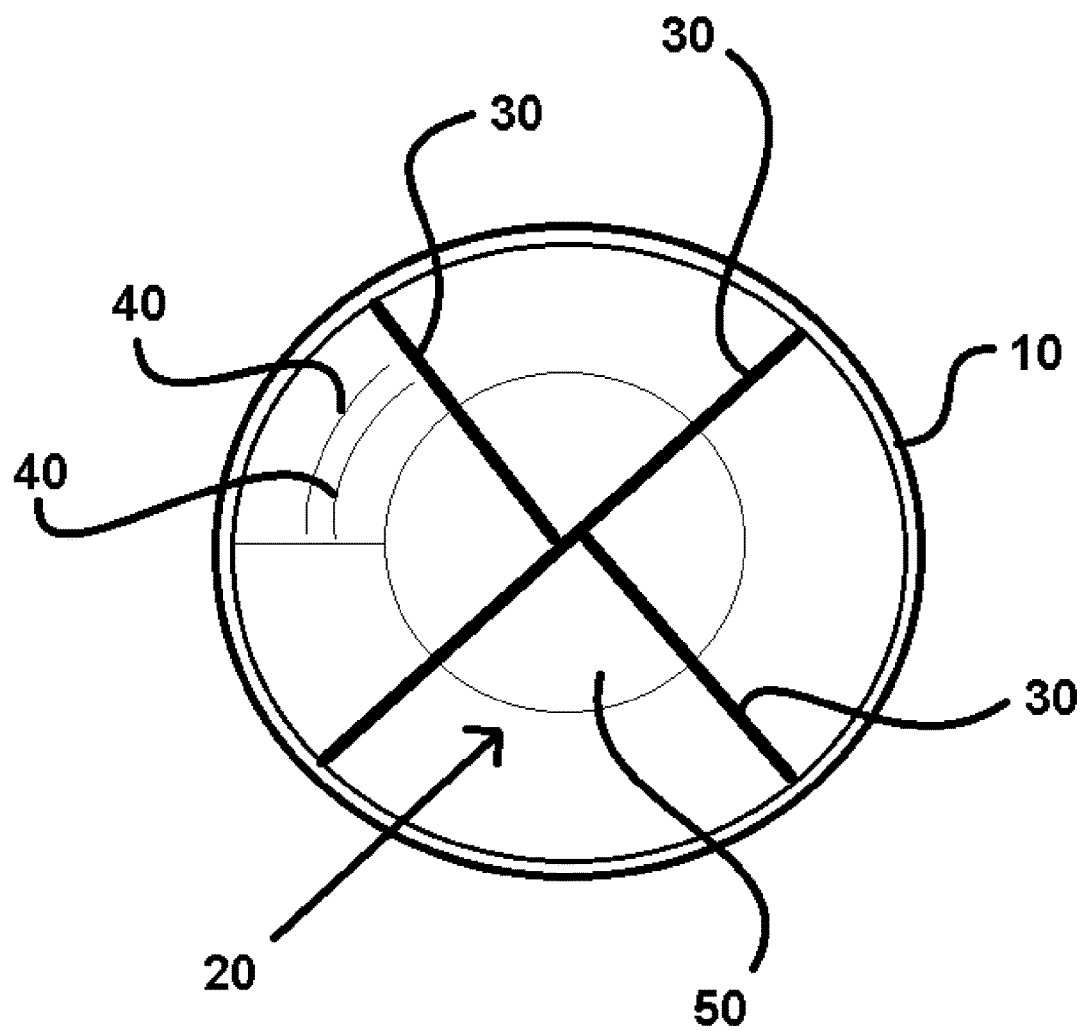
FIG. 1 depicts a view of a top of the container apparatus of the present invention, depicting a four-way separator housed within the container.
Figure 3B:
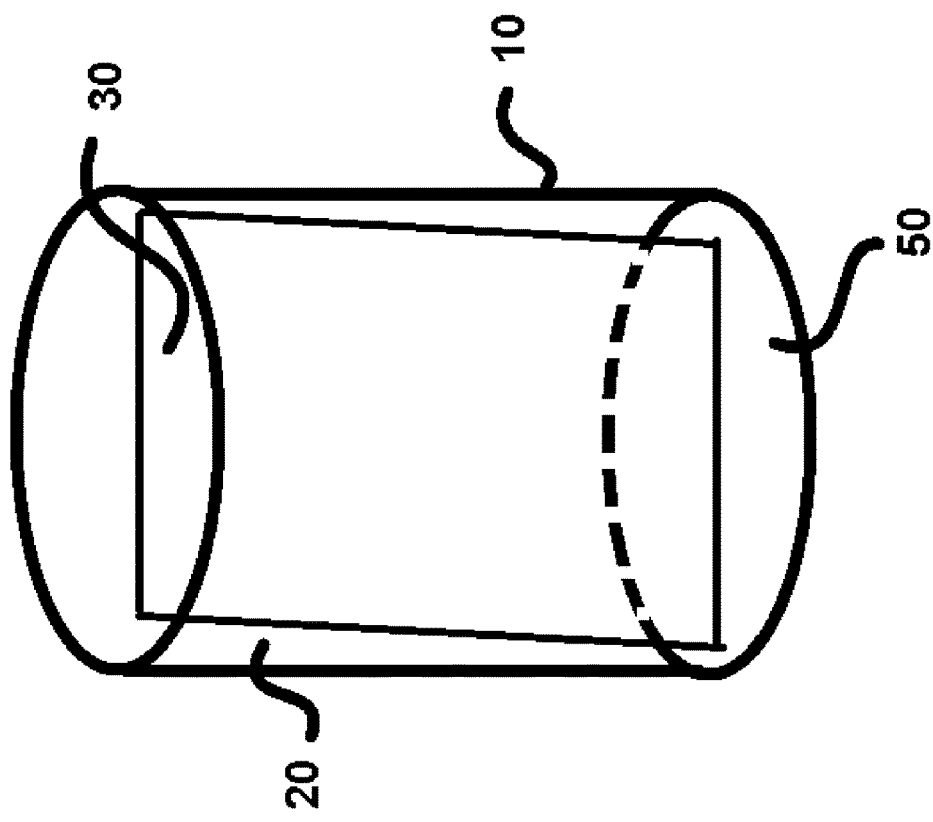
FIG. 3B shows an embodiment of the container apparatus of the present invention, depicting the use of a single cross-sectional separator, as seen from the side.
Figure 3A:
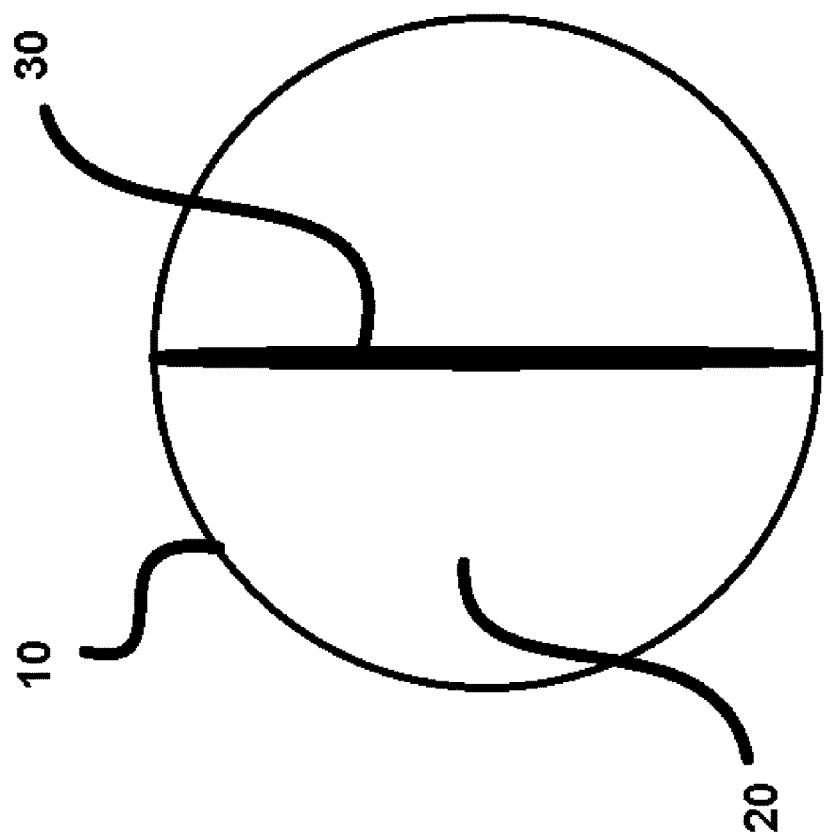
FIG. 3A shows an embodiment of the container apparatus of the present invention, depicting the use of a single cross-sectional separator, as seen from the top.

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention is a container for transport and consumption of frozen foods. The container is equipped with a body (10), cavity (20), and at least one separator (30) disposed within the cavity (20). The at least one separator (30) is not preferably affixed to the body (10) of the container, but rather loosely rests within the cavity (20) of the container. As such, the at least one separator (30) is preferably easily removable from the cavity (20) of the container. The body (10) of the container has a bottom (50) which may be smaller than a top or opening of the body (10) of the container of the present invention. The at least one separator (30) preferably extends all the way to the bottom (50) of the container, and may be in contact with the bottom (50).

The at least one separator (30) of the present invention separates the cavity (20) of the container into smaller spaces to facilitate the storage of frozen foods. For instance, a cylindrical embodiment of the container could be used to store a mixture of ingredients to prepare a smoothie. By separating the cylindrical cavity (20) into smaller spaces using a cross-sectional design, the smaller spaces created by the at least one separator (30) prevent the mixture of ingredients, and thereby prevents the formation of a large and bulky mass. Instead the cross sectional separation provided by the at least one separator (30) only allows some of the ingredients to stick, forming smaller chunks of ingredients. At the moment of use, when trying to liquefy the mixture using a blender, this separation is very effective. Separating the mixture of ingredients into smaller pieces can reduce the blend time significantly, expediting the smoothie creation process.

Another remarkable use of the apparatus is to easily prepare Ice Cream in a healthier and fresher manner. All present ice creams available on the market, even the most "natural and additive free" ones contain at least some food additive to provide a creamy texture to prevent the ice cream from becoming a solid ice chunk difficult to spoon and stabilizers to keep uniformity in the mixture of ingredients. The food additive is sometimes Guar Bean and or Acacia Tree Gum, but there are many others.

What is unique about the present invention when used for Ice Cream preparation, is that the frozen food ingredients can be turned into a healthy and creamy Ice Cream in less than one minute without containing any food additives. In less than one minute, the whole frozen ingredients of the container of the present invention can be easily transformed into a guilt-free ice cream by simply blending with a smaller liquid base quantity.

Since the contents of the container of the present invention are configured to be prepared right before consumption with only whole ingredients, the end result is a better, fresher taste which is even creamier than traditional ice cream without needing food additives. The container of the present invention is equipped with a liquid base measuring indicator both for a smoothie and for ice cream preparation. The liquid base measuring indicator is preferably disposed within the cavity of the container, as indicated by at least one line. (40) The at least one line (40) can be seen in FIG. 1.

Figure 4:
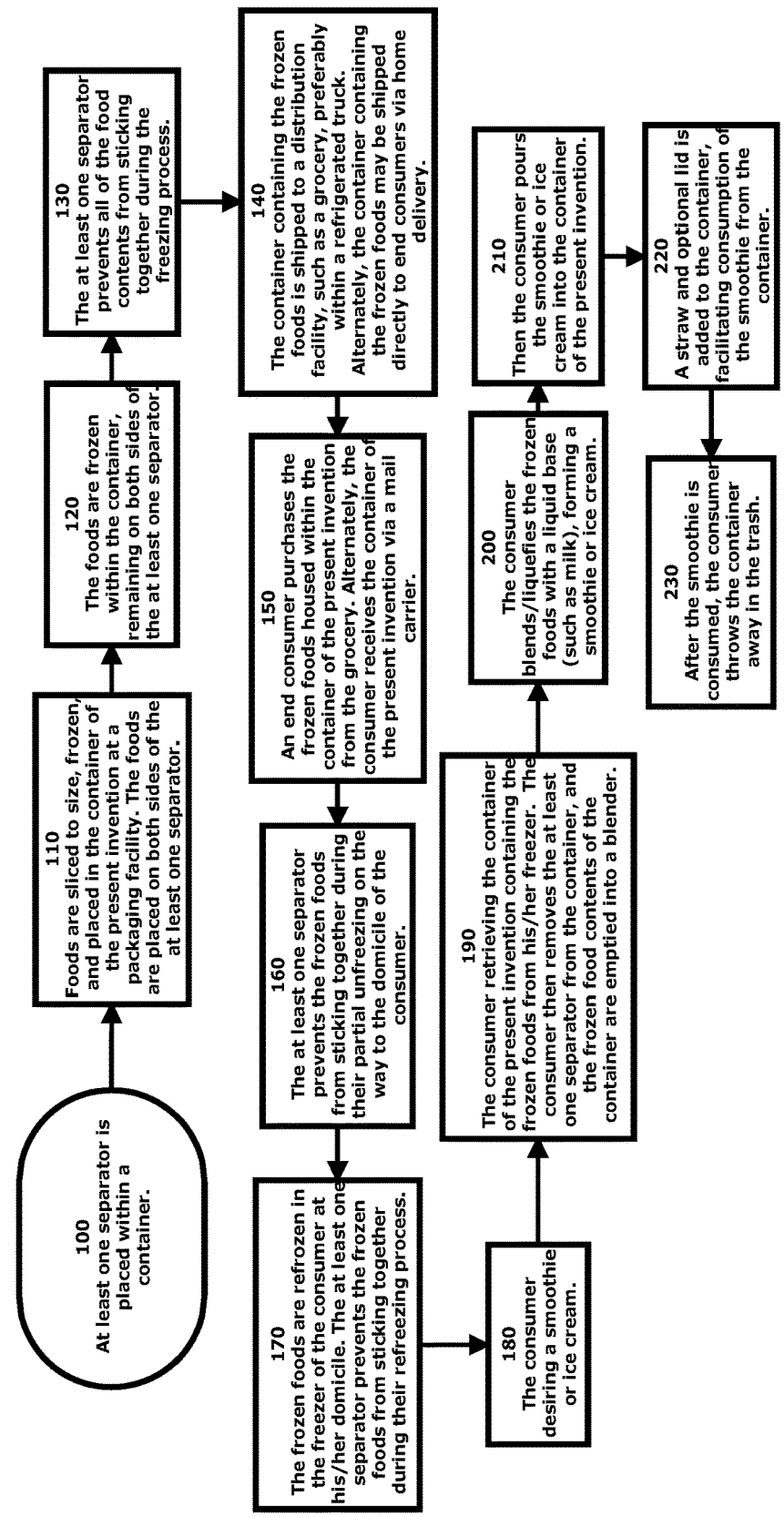
FIG. 4 exhibits a flow-chart detailing the process of use of the present invention.

The process of use of the present invention, as depicted in FIG. 4, is preferably a follows:
1. At least one separator is placed within a container. (100)
2. Foods are sliced to size, frozen, and placed in the container of the present invention at a packaging facility. The foods are placed on both sides of the at least one separator. (110) It should be noted that the foods may include fruits and vegetables, as well as nuts, seeds, coffee, herbs, cereals, grains, and/or beans.
3. The foods are frozen within the container, remaining on both sides of the at least one separator. (120)
4. The at least one separator prevents all of the food contents from sticking together during the freezing process. (130)
5. The container containing the frozen foods is shipped to a distribution facility, such as a grocery, preferably within a refrigerated truck. (140) Alternately, the container containing the frozen foods may be shipped directly to end consumers via home delivery. In such cases, the end consumer purchases the frozen food housed within the present invention online via an e-retailer or eCommerce website. Therefore, it should be understood that the present invention may be purchased from website via a computer or mobile device. Similarly, consumers may—purchase via a mobile device application, Amazon™, or other similar e-retail vendors.
6. An end consumer purchases the frozen foods housed within the container of the present invention from the grocery. (150) Alternately, the consumer receives the container of the present invention via a delivery service.
7. The at least one separator prevents the frozen foods from sticking together after they partially unfreeze on the way to the domicile of the consumer (as well as while they are refrozen in the consumer's domicile.). (160) If the container of the present invention is shipped directly to the consumer, dry ice may be used to ensure the contents remain frozen in transit. The at least one separator mitigates the risk of the rising temperatures affecting the frozen contents due to the sublimation of the dry ice.
8. The frozen foods are refrozen in the freezer of the consumer at his/her domicile. (170) The at least one separator (30) prevents the frozen foods from sticking together during their refreezing process.
9. The consumer desiring a smoothie or ice cream. (180)
10. The consumer retrieving the container of the present invention containing the frozen foods from his/her freezer. The consumer then removes the at least one separator from the container, and the frozen food contents of the container are emptied into a blender. (190) Due to the placement of the at least one separator, the frozen foods are easily removed from the container in multiple segments, rather than in one frozen chunk.
11. The consumer blends/liquefies the frozen foods with a liquid base (such as milk), forming a smoothie or ice cream. (200)
12. Then the consumer pours the smoothie or ice cream into the container of the present invention. (210)
13. A straw and optional lid is added to the container, facilitating consumption of the smoothie from the container. (220) Alternatively, a spoon is used to consume the food contents if in the form of ice cream.
14. After the smoothie/ice cream is consumed, the consumer throws the container away in the trash. (230)

It should be understood that the container of the present invention may be fashioned in a variety of shapes and sizes, including, but not limited to a square shape, a cylindrical shape, a rectangular shape, a hexagonal shape, or other trapezoidal shape. Additionally, it should be understood that the container and at least one separator (30) of the present invention may be fashioned of a variety of materials, all of which are preferably responsibly disposable. Likewise, the container and at least one separator (30) of the present invention may be available in a variety of colors, patterns, and textures.

Brief instructions for use are preferably displayed on the container itself, and may include the following:

Smoothie Preparation

Frozen foods can be prepared as a smoothie on-the-go when liquefied in a blender with a liquid base (i.e. 300 ml of liquid base such as skim milk).

1. Remove lid and foil from the container.
2. Remove the at least one separator from container
3. Toss the mixture of ingredients into the blender
4. Use the liquid base measure indicator for smoothie in the paper cup to add 300 ml of your favorite choice of milk to the blender
5. Liquefy in the blender
6. Then pour the smoothie back into the container
7. Add the lid and straw to drink on-the-go Ice Cream Preparation Also, the same frozen product can easily be prepared as a guilt-free ice cream when liquefied with a smaller milk quantity (i.e. 60 ml) in a blender, or preferably within a food processor.

1. Remove lid and foil from the container.
2. Remove the at least one separator from container
3. Toss the mixture of ingredients into the blender, or preferably food processor
4. Use the liquid base measure indicator for ice cream in the container to add 60 ml of your favorite choice of milk to the blender or preferably food processor.
5. Liquefy in the blender, or preferably food processor.
6. Then, toss the ice cream back to the container.
7. Use a spoon to eat on-the-go.

It should be understood that the present invention is configured to mitigate the risk of the ingredients sticking together while being frozen during packaging, and also while refrozen after transportation. The small detail is that they do not stick together during their partial unfreezing, but instead during, the re-freezing process after being partially unfrozen.

It should be noted that, during the packaging process, the foods could be frozen or not frozen before being placed into the container, and then frozen after being put into the container. Of course, freezing the foods first could improve the quality of the final product. However, the present invention still helps to deliver a useful, delicious product despite not freezing before packaging (it is still easy to blend), and furthermore to mitigate the risk of sticking together during transit to the consumer or distributor (partially unfreezing).

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A method for packaging, transporting, and consuming a frozen food product comprising:
    placing at least one separator into a container;
    wherein the at least one separator separates a cavity of the container into multiple segments;
    slicing foods into pieces such that they fit within the segments;
    freezing the foods;
    placing the foods into the segments;
    sealing the foods within the container with a seal;
    the at least one separator preventing the foods from freezing together into a unitary piece;
    transporting the container to an end consumer;
    the end consumer receiving the container;
    removing a lid of the container;
    peeling back the seal;
    removing the at least one separator from the container;
    tossing the frozen food from the container into a blender;
    using a liquid base measure indicator disposed within the container to add the needed quantity of liquid base for the desired blended food;
    wherein the liquid base measure indicator is present in the form of at least one horizontal line disposed within the container;
    blending the frozen food with a liquid base, forming blended food;
    wherein the blended food is chosen from the group: ice cream, smoothie, smoothie bowl, nice cream, ice treat;
    pouring the blended food back into the container;
    replacing the lid; and
    consuming the food from the container via a straw.

2. The method of claim 1, wherein the foods are fruits.

3. The method of claim 1, wherein the foods are superfoods.

4. The method of claim 1, wherein the foods are fruits and superfoods.

5. The method of claim 1, wherein the liquid base measure indicator is disposed on the at least one separator.

6. The method of claim 1, wherein the at least one separator is disposed in a horizontal orientation within the cavity.

7. The method of claim 1, wherein the blender is a food processor.

8. A method for packaging, transporting, and consuming a frozen food product comprising:
    placing fruit into sections of a container;
    wherein the sections of the container are separated by at least one separator;
    freezing the fruit within the container, forming frozen fruit;
    the at least one separator keeping the frozen fruit separate;
    removing the at least one separator from the container;
    removing the frozen fruit in separate pieces per the at least one separator;
    blending the frozen fruit in a blender, forming blended fruit;
    placing the blended fruit back into the container;
    serving the blended fruit in the container; and
    consuming the blended fruit from the container.

9. The method of claim 8, further comprising:
    adding a fluid to the container prior to blending the frozen fruit; and
    wherein the fluid is added such that it approaches a liquid base measure indicator.

10. The method of claim 9, wherein the liquid base measure indicator is disposed on an interior wall of the container; and wherein the liquid base measure indicator is a horizontal line.

11. The method of claim 9, wherein the liquid base measure indicator is disposed on the at least one separator; and wherein the liquid base measure indicator is a horizontal line.

12. The method of claim 8, wherein the blender is a food processor.

13. The method of claim 8, wherein the at least one separator is disposed in a horizontal orientation within the cavity.

14. The method of claim 10, wherein the at least one separator is disposed in a horizontal orientation within the cavity.

15. The method of claim 10, wherein the at least one separator is disposed in a horizontal orientation within the cavity.

\* \* \* \* \*